United States Patent
Alejo Trevijano

[11] Patent Number: 6,144,404
[45] Date of Patent: Nov. 7, 2000

[54] ELECTRONIC STEREOSCOPIC SYSTEM

[76] Inventor: Jose Javier Alejo Trevijano, Conde de Torrejón, 14-1ª, planta-41003 Sevilla, Spain

[21] Appl. No.: 08/894,970
[22] PCT Filed: Jan. 3, 1997
[86] PCT No.: PCT/ES97/00002
  § 371 Date: Sep. 3, 1997
  § 102(e) Date: Sep. 3, 1997
[87] PCT Pub. No.: WO97/25819
  PCT Pub. Date: Jul. 17, 1997

[30] Foreign Application Priority Data
  Jan. 5, 1996 [ES] Spain ..................... 9600023

[51] Int. Cl.⁷ ..................................... H04N 13/00
[52] U.S. Cl. ................. 348/42; 345/52; 348/51
[58] Field of Search .................. 348/42, 51, 54, 348/169, 55, 49, 335, 53; 345/31, 52; 359/462, 471, 472, 619; 349/194

[56] References Cited

U.S. PATENT DOCUMENTS

| | | | |
|---|---|---|---|
| 4,943,852 | 7/1990 | Femano et al. | 348/42 |
| 4,953,949 | 9/1990 | Dallas | 359/619 |
| 5,075,676 | 12/1991 | Ando | 345/52 |
| 5,457,574 | 10/1995 | Eichenlaub | 359/619 |
| 5,541,745 | 7/1996 | Fergason | 349/194 |
| 5,670,970 | 9/1997 | Yamazaki | 348/53 |
| 5,815,314 | 9/1998 | Sudo | 348/42 |

FOREIGN PATENT DOCUMENTS

| | | |
|---|---|---|
| 233636 | 8/1987 | European Pat. Off. . |
| 262955 | 4/1988 | European Pat. Off. . |
| 2-14697 | 1/1990 | Japan . |
| WO 9526612 | 10/1995 | WIPO . |

Primary Examiner—Chris S. Kelley
Assistant Examiner—Gims Philippe
Attorney, Agent, or Firm—Klauber & Jackson

[57] ABSTRACT

The invention is based upon the use of the characteristic of LCD screen which offer the possibility of directing the visibility angle of said screens as a function of the voltage applied. By directing said angle towards one eye or the other of the viewer alternatingly, as a function of previously recorded stereoscopic images and at a sufficiently high rate so that the viewer cannot perceive discontinuities, a tri-dimensional effect in the image received by said viewer is obtained. The block diagram of one of the invention includes an image generating system 2 connected to an LCD screen 1 and to an image synchronization block 3 which is connected to an angle generator system 4, the latter providing the necessary voltages to the screen 1 in order to direct the image from the screen to one or the other eye of the viewer.

9 Claims, 2 Drawing Sheets

ELECTRONIC STEREOSCOPIC SYSTEM

As expressed in the title of this specification, the present invention refers to an electronic stereoscopic system, whose purpose consists of providing three-dimensional images upon applying it to the television, cinematographic or other audiovisual means, without the viewer having to use special complementary glasses and without the need of the viewer having to make special visual efforts to perceive the three-dimensional effect of the image.

BACKGROUND OF THE INVENTION

Natural three-dimensional vision is produced by each eye perceiving the image of the objects from a view point slightly different from that of the other eye of a specific person, allowing depths and reliefs to be perceived, after the corresponding integrating and processing of the images in said person's brain.

Different systems in order to adapt three-dimensional images previously registered in a special way, and which try to imitate natural three-dimensional vision, are known.

Since photography and cinematography have come into existence, an infinite number of ways to reproduce and view three-dimensional images has been sought.

The simplest systems consist of taking two simultaneous photographs of a single object from slightly different angles, so that the two lenses of the corresponding cameras have a separation equivalent to that between a person's eyes. Subsequently, once the two photographs are developed they are placed on a plane with an opaque barrier perpendicular to said plane and the viewer brings his face towards this barrier in such a way that his right eye only sees the photograph that corresponds to it and his left eye only sees the other photograph, thus obtaining the three-dimensional effect.

Anaglyphs, that are produced by means of printing stereographs in the form of superimposed images of two complementary colors, for example, red and green, are known. For three-dimensional vision, some glasses with filters of said two colors are used, each one of them over each eye, so that each eye only sees the stereo image that corresponds to it.

On the other hand, there are systems of polarized light in which two beams are projected on a screen, one of them polarized vertically and the other one polarized horizontally, thanks to some, filters coupled to the projection lenses. The viewers have to wear polarized glasses whose planes are oriented in such a way that each eye receives only the image that corresponds to it.

There are also autostereoscopic three-dimensional viewing means, which are those in which the viewer does not need any complementary glasses or viewing device. Among these methods are holographs, which are photographic techniques which use laser light; magic images which are those in which the image is broken down and the three-dimensional effect appears before a specific focus by the viewer; and parallactic stereograms which is the system that is the most similar to the present invention.

In parallactic stereograms, a grating of lines or traces in contrast to the emulsion acts as a mask, allowing separate registering of the left and right images as a series of vertical lines. The positive transparency is projected on the screen through a similar grating, in such a way that each eye only sees the appropriate image. A normal grating produces the loss of a large amount of light (805), therefore, almost all the modern systems use gratings formed by cylindrical and fine lenses.

SUMMARY OF THE INVENTION

The present invention comprises an electronic stereoscopic system that is a type of parallactic stereograph but obtained electronically and achieving a greater image resolution. For this purpose, the invention uses a characteristic of liquid crystal screens. This characteristic is the possibility of changing the viewing angle of the projected image, by means of varying the voltage in these liquid-crystal screens.

A liquid-crystal screen of the type that portable computers use is comprised of a matrix of thousands of light spots called pixels. The viewing angle of the image that these pixels provide is reduced and their projecting directionalization can be electronically varied by-means of the voltage fed to the same.

If, with a liquid-crystal screen the same angles and directions as those of a parallactic system are reproduced pixel by pixel, a three-dimensional effect similar to a parallactic system is obtained.

The invention exceeds in clarity over the parallactic system without reducing resolution of the image. For this purpose, the images of the liquid-crystal screen are directed electronically and successively towards the viewer's right eye and left eye at a rate rapid enough so that said viewer does not perceive the discontinuities, In terms of the models and brands, 50 to 70 fixed images or squares per second, whose succession gives the sensation of movement, are generated on the screen of a portable computer. The frames can be alternately directed, one by one or in small groups towards the left eye or towards the right eye, which achieves the effect of stereoscopic vision without reducing resolution from the image.

The block diagram of the invention includes a digital image generating system connected to a liquid-crystal screen and to an image synchronization block which in turn connects with said screen through an angle generator system.

This angle generator system applies different voltages or potential differences to the screen in terms of the viewing angle desired on the same.

The invention is applicable to all types of screens, luminescent or not, monochromic or color screens, as long as they have the viewing characteristics (directable angle) of the liquid-crystal (LCD) screens, such as luminescent, TFT, phosphorescent, electromechanical type screens, etc.

The invention is also applicable to three-dimensional cathode ray tube (CRT) screens of those that most televisions and computers use, and even slide projectors and any other method of image generation in general. Therefore, in front of the television monitor, generated image or the like, a transparent liquid-crystal screen, whose pixels will be directed towards the viewer's right eye and left eye as stated above, is placed. Of course, in this case, the television monitor or generated images must emit stereographic images that will have to be synchronized with the direction carried out on the cited transparent screen.

The synchronization between a television frame and the electronic directionalization towards the left eye or the right eye can be achieved in various ways, but one of great versatility, given that it releases to the transparent screen electrically connected to the television monitor, is the following: the electronic beam that generates the light spots on a CRT screen, begins its exploration in the top left corner and ends in the bottom right corner. Detecting the passing of the last spot of the image the end of a frame is obtained. This detection may be obtained with a type of optical sensor which upon being activated directs the transparent LCD screen in one direction or the other. This system is valid for distances that do not exceed a distance of 1 or 1.5 meters between the viewer and the television monitor. For larger distances there is the possibility of approaching the LCD screen to the viewer and moving it away from the television monitor, in which case the connection between said LCD screen and the optical sensor applied to the monitor can be done by means of cables, ultrasound or infrared rays. There is also the possibility, for cases in which the viewer is rather far away from the television monitor, to keep a small distance between the LCD screen and the viewing spot, in which case the LCD screen is comprised of a single polarizer and the viewer will wear some glasses whose left and right lenses have opposite polarizations to achieve the stereoscopic effect, in such a way that if voltage is applied to the LCD the viewer will see out of one eye and if none is applied, he will see out of the other.

Another variant of the invention consists of the screen having half of its pixels directed permanently towards the left eye and the other half permanently directed towards the right eye. In this case, the distribution of pixels directed in one direction or the other on the screen will be done alternately, by lines, spots, or small areas, so that each frame of image perceived by the retina occupies a uniform distribution over all the screen although it only affects one of the viewer's eyes.

Another solution to direct the pixels of the liquid-crystal screen consists of placing behind it two angularly arranged lenses, placing behind each lens a mask or polarizer and a lamp, in such a way that the illumination of a lamp produces a light beam towards the viewer's left eye and the illumination of the other lamp generates another light beam towards the right eye. In this case, the cited lamps must turn on and turn off alternately and synchronically with the image frame of the screen that are to be directed towards one eye or the other.

Hereinafter, to provide a better understanding of this specification and forming an integral part of the same, some figures in which the object of the invention has been represented with an illustrative and non-restrictive manner are attached hereto.

DETAILED DESCRIPTION OF THE INVENTION

Hereinafter a description is made of several embodiments of the invention, making reference to the numbering used in the figures.

Figure 1:
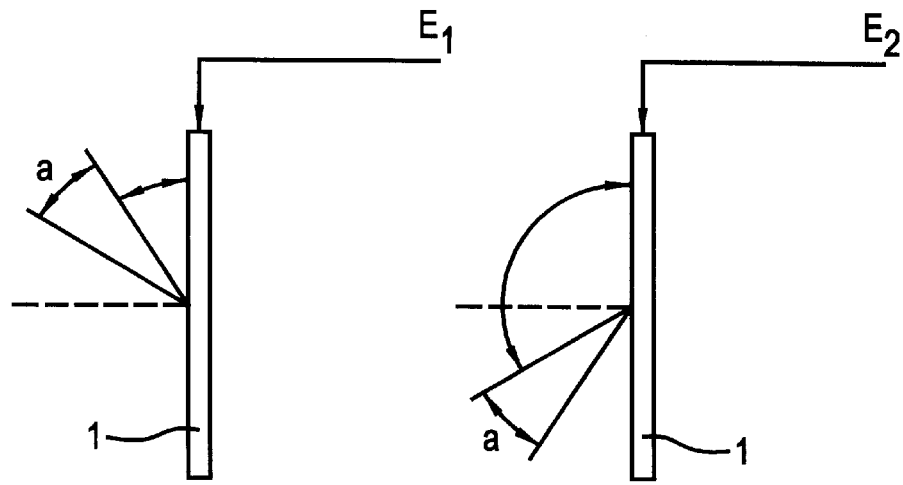
FIG. 1 schematically represents the different viewing angles that a liquid-crystal screen has upon applying different voltages to it, according to the electronic stereoscopic system of the present invention.
Figure 2:
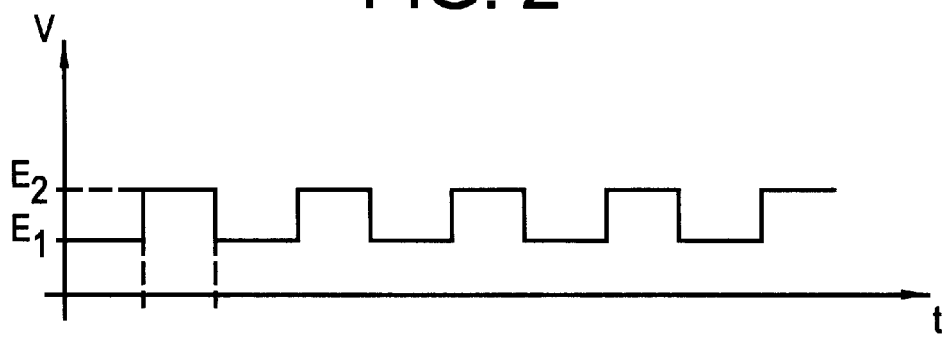
FIG. 2 is a graph of the voltage with respect to the time that is used to feed a crystal-liquid screen of the system of the invention, in order to direct its :Viewing angle towards the viewer's left eye and right eye, alternately and as required.

Hence, the electronic stereoscopic system of the first embodiment uses a characteristic of liquid crystal screens (1), used in FIG. 1. Said characteristic consists of applying a specific voltage $E_1$ to the screen (1), the viewing angle "a" having a certain slant with regard to said screen (1); while if another voltage $E_2$ is applied to the very same screen (1), said slant varies. Therefore, the visibility of the screen (1) can be directed in terms of the voltage applied, directing it towards the viewer's right eye and left eye alternately. For this purpose, it suffices to apply to the screen (1) a voltage wave "V" such as the one shown in FIG. 2, wherein $E_1$ represents the voltage that directs the visibility of the screen towards the viewer's left eye and $E_2$ is the voltage that directs it towards the viewer's right eye.

The times that $E_1$ and $E_2$ are maintained are to be the same and they may cover from a minimum equivalent to one frame of the visual program up to a maximum equivalent to small groups of said frames, as long as it is short enough so that the viewer's brain does not perceive the alternation of direction.

In the event that the time that $E_1$ and $E_2$ is kept is equivalent to a frames, the emission or registering of the visual program has to be corresponding, in such a way that a frame corresponds to the stereo image for one eye and the following frame corresponds to the stereo image for the other eye. Likewise, if $E_1$ ad $E_2$ are kept for small groups of frames, the emitted images will have to correspond with said small groups. In any case a synchrony between the stereo images emitted and the voltages $E_1$ and $E_2$ applied to the liquid-crystal screen (1) is necessary.

Figure 3:
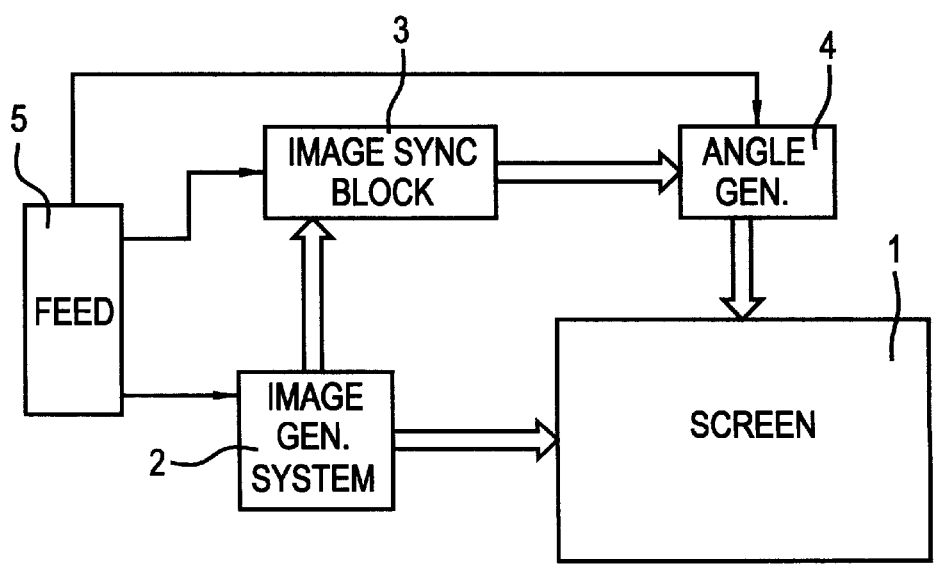
FIG. 3 schematically represents a block diagram of the electronic stereoscopic system of the present invention.

FIG. 3 shows a block diagram that allows said synchrony to be carried out by making the electronic stereoscopic system of the invention operative. In said diagram screen (1) receives the stereo video signal from a digital image generating system (2). This digital system (2) also connects to an image synchronization block (3) which in turn connects to an angle generator system (4). The angle generator system (4) also connects to the screen (1) in order to provide said screen (1) with voltages $E_1$ and $E_2$ in terms of the desired viewing angle, in a way congruent to the stereo image produced by the digital system. (2).

The block (5) represents the feed of the other blocks or systems (2), (3) and (4).

In another embodiment, the invention is applied to a conventional television set (6) of those that include a cathode ray tube screen (7). For this purpose, in front on said screen (7), it is necessary to put a transparent LCD screen (8) whose visibility will be directed by voltages $E_1$ and $E_2$ as stated above.

Figure 4:
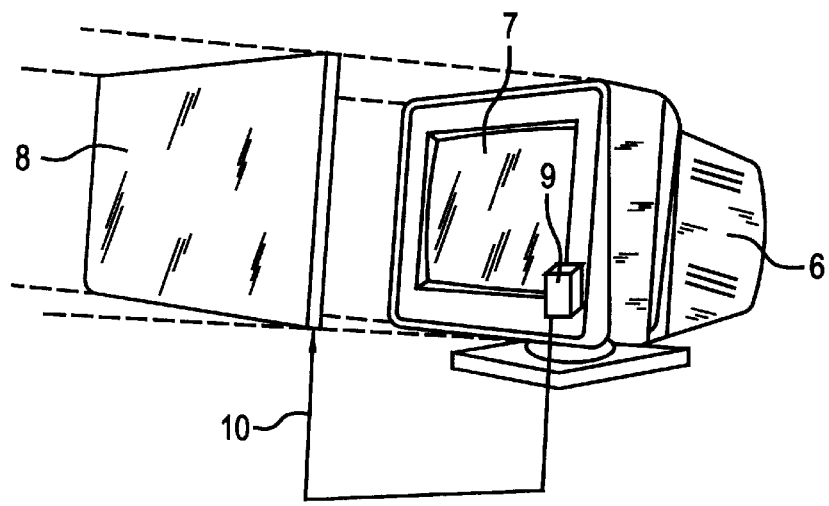
FIG. 4 is a perspective schematic view of a variant of the stereoscopic system of the invention in its application to conventional television sets with cathode ray rube screens.

Logically, the images emitted by the television set (6) have to be stereo ones, in other words, capable of being perceived alternately by one eye or the other during the times that voltages $E_1$ and $E_2$ last. Therefore, a synchrony between the television set (6) and the directionalization of the transparent screen (8) is necessary. This can be carried out without the need of a direct connection between said elements, since a type of optical sensor (9) applied to the bottom right corner of a conventional CRT screen (7) can perceive the end of a frame of said screen (7). In this case, said optical sensor (9) has to have a connection (10) with the transparent screen (8), providing voltages $E_1$ and $E_2$ at the adequate moments, as one can see in FIG. 4. However, said connection (10) aside from being by means of a cable, can be done in a wireless manner by means of infrared rays or ultrasound, thus obtaining a great physical independence of all of the elements that permit different separations of the same. This is especially useful when one desires a larger distance between the viewer and the television set (6), since the system is still valid by simply bringing the transparent screen (8) closer to the viewer. There is also the possibility, for relatively large viewing distances, that said screen (8) is comprised of a polarizer and that the viewer wears glasses with the left and right lenses with different polarizations.

Figure 5:
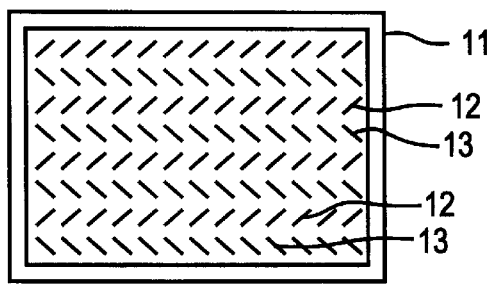
FIG. 5 schematically represents a front view of a special screen wherein its pixels or viewing spots have two different permanent directions, said screen being used for one variant of the electronic stereoscopic system of the invention.
Figure 6:
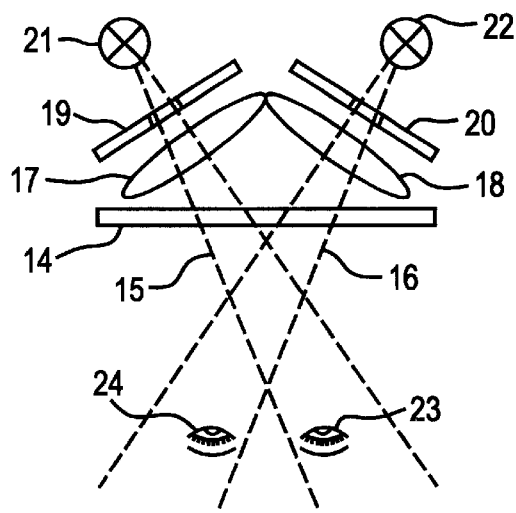
FIG. 6 represents a top plan and schematic view of another image directing means applicable to the electronic stereoscopic system of the present invention.

Another embodiment of the invention consists of the screen (11) of the system having its image spots or pixels (12) and (13) permanently directed towards one eye or the other alternately, as one can see in FIG. 5, which is equivalent to two fused screens, one for the left eye and the other for the right eye, each one receiving from said two screens the corresponding stereo image, In this case, the distributions of the spots (12) and (13) with different directionalization must be homogeneous and uniform upon the entire surface of the screen (11) so that there are no irregularities in perceiving the image. The pixels may be LED diodes, light bulbs or ends of optic fiber cable.

The final embodiment that is set forth in this section consists of directing the pixels of one liquid, -crystal screen (14) by means of light beams (15) and (16) instead of by voltages $E_1$ and $E_2$. For this purpose, behind the screen (14) there are two lenses (17) and (18) placed angularly and followed by respective masks or gratings (19) and (20) and respective lights or lamps (21) and (22), in such a way that the illumination of one lamp (21) reaches the viewer's right eye (23) and that of the other lamp (22) reaches the viewer's left eye (24). Lamps (21) and (22) turn on and turn off alternately and synchronically with regard to the video frames of the screen (14) that are to be directed towards one eye or the other (23) and (24) in order to obtain the stereo image.

What is claimed is:

1. An electronic stereoscopic system for sending different images towards a viewer's left eye and right eve to generate, for the viewer, a three-dimensional view of an image, said electronic stereoscopic system comprising:

image generating means for generating a successive series of frames of images;

directing means, coupled to the image generating means comprising a liquid-crystal screen for directing one or more of the successive series of frames of images towards a viewer's left eye and right eye independently, at a rate sufficient so that the viewer's eyes do not perceive discontinuities due to persistence of vision, so as to generate a stereoscopic image; and an image synchronization block, coupled to said directing means comprising the liquid-crystal screen and said image generating means, for synchronizing direction of the one or more of the successive series of frames of images with generation of the one or more of the successive series of frames of images, wherein the image generating means comprises a television which emits, as alternate groups each of at least one frame, stereographic images, wherein said liquid-crystal screen is placed in front of the television;

wherein the synchronization block is coupled to the television by an optical sensor which determines when the end of a frame occurs.

2. The electronic stereoscopic system of claim 1, wherein the directing means directs images towards alternate ones of a viewer's eyes successively and alternately in time intervals corresponding to one or more frames of the image generating means.

3. The electronic stereoscopic system of claim 1, wherein the directing means further comprises an electronic circuit which applies, in response to signals received from the image synchronization block, selected predetermined potential voltages to the liquid-crystal screen, so as to selectively alter viewing angle of images transmitted through the liquid-crystal screen.

4. The electronic stereoscopic system of claim 1, wherein the synchronization block is coupled to the television by one of ultrasounds, infrared rays, and a cable so as to permit separation of said liquid-crystal screen with respect to television and separation of the viewer with respect to said television.

5. The electronic stereoscopic system of claim 1, wherein the liquid-crystal screen comprises a polarizer which is selectively polarized so as to allow three-dimensional viewing at a distance by means of the viewer wearing glasses having lenses which are polarized oppositely.

6. A The method, using an electronic stereoscopic system, for sending different images towards a viewer's left eye and right eye to generate, for the viewer, a three-dimensional view of an image, method comprising the steps of:

generating, in an image generator, a successive series of frames of images, directing, using a liquid-crystal screen, one or more of the successive series of frames of images towards a viewer's left eye and right eye independently, at a rate sufficient so that the viewer's eyes do not perceive discontinuities due to persistence of vision, so as to generate a stereoscopic image, and synchronizing direction of the one or more of the successive series of frames of images with generation of the one or more of the successive series of frames of images, wherein said step of synchronizing further comprises the step of applying selecting predetermined potential voltages to the liquid-crystal screen so as to selectively alter viewing angle of images transmitted through the liquid-crystal screen, and wherein said step of generating comprises the step of generating an image using an image generator comprising a television which emits, as alternate groups each of at least one frame, stereographic images, wherein said step of directing comprises the step of placing the liquid-crystal screen in front of the television, and wherein said step of synchronizing comprises the step of generating a synchronizing signal from an optical sensor coupled to the television to determine when the end of a frame occurs.

7. The method of claim 6, wherein the liquid-crystal screen directs images towards alternate ones of a viewer's eyes successively and alternately in time intervals corresponding to one or more frames of the image generator.

8. The method of claim 6, wherein said step of synchronizing comprises the step of coupling the optical sensor to the television by one of ultrasounds, infrared rays, and a cable so as to permit separation of the liquid-crystal screen with respect to television and separation of the viewer with respect to the television.

9. The method of claim 8, wherein the liquid-crystal screen comprises a polarizer which is selectively polarized so as to allow three-dimensional viewing at a distance by means of the viewer wearing glasses having lenses which are polarized oppositely.

* * * * *

UNITED STATES PATENT AND TRADEMARK OFFICE
CERTIFICATE OF CORRECTION

PATENT NO : 6,144,404
DATED : November 7, 2000
INVENTOR(S): Jose Javier Alejo Trevijano It is certified that error appears in the above-identified patent and that said Letters Patent is hereby corrected as shown below:

Under (86) Section 371 Date and 102(e) date on the face of the Patent, please change the filing date from "September 3, 1997" to --September 2, 1997--

Signed and Sealed this

Eighth Day of May, 2001

Attest:

NICHOLAS P. GODICI

Attesting Officer

Acting Director of the United States Patent and Trademark Office